O. COLBORNE.
PIE CRUST FORMING MACHINE.
APPLICATION FILED MAY 25, 1908.
956,683.
Patented May 3, 1910.
2 SHEETS—SHEET 1.
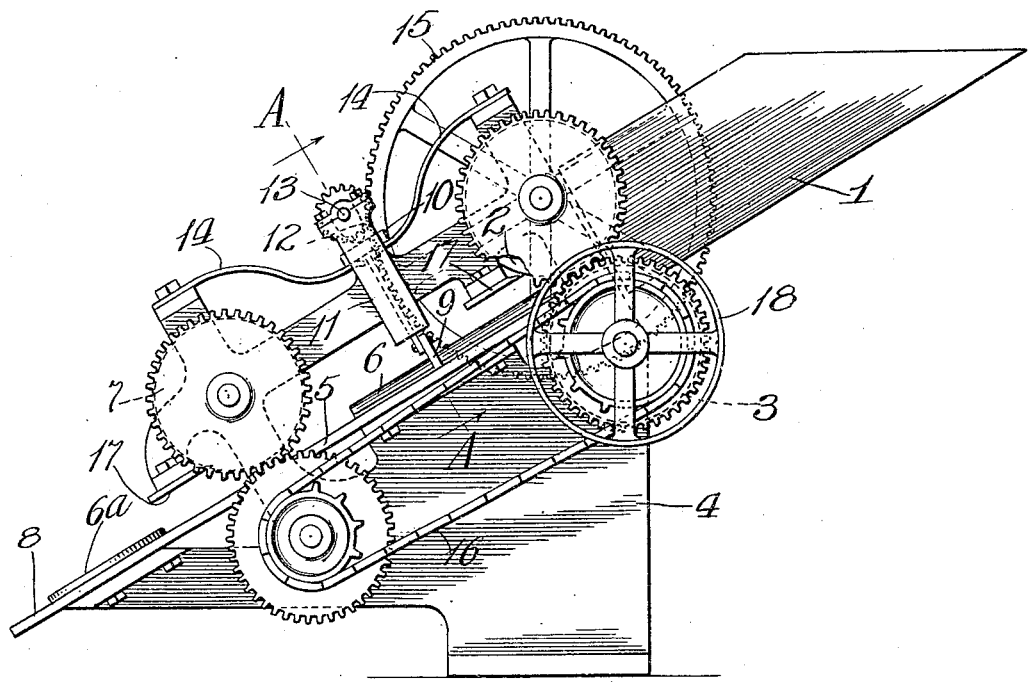
Fig. 1.
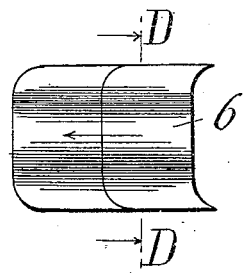
Fig. 6.
Fig. 7.
Fig. 8.
Witnesses
Harry R. L. White
R. A. White
Inventor
Oliver Colborne,
By Kummler & Kummler,
Attys

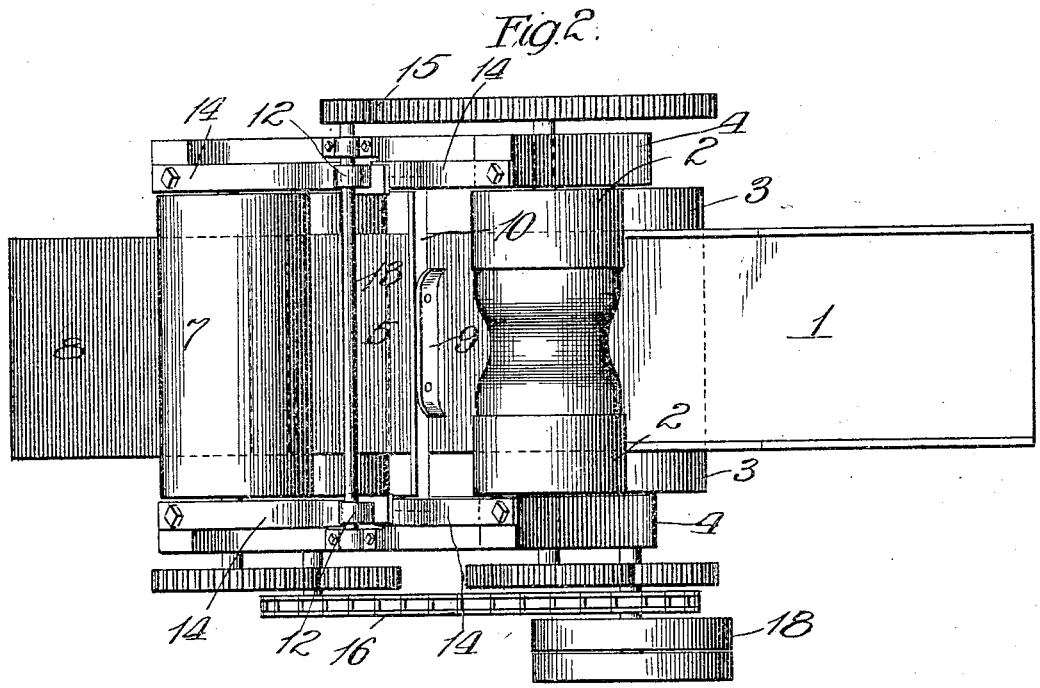

UNITED STATES PATENT OFFICE.

OLIVER COLBORNE, OF CHICAGO, ILLINOIS.

PIE-CRUST-FORMING MACHINE.

956,683.  Specification of Letters Patent.  Patented May 3, 1910.

Application filed May 25, 1908. Serial No. 434,749.

*To all whom it may concern:*

Be it known that I, OLIVER COLBORNE, a citizen of the United States of America, and a resident of Chicago, county of Cook, State of Illinois, have invented certain new and useful Improvements in Pie-Crust-Forming Machines, of which the following is a specification.

The main object of this invention is to provide an improved form of pie crust forming apparatus which is capable of rolling out a mass of dough, dividing it into sections of equal size, rolling out each section into the form of a thin flat disk suitable for use as a pie crust, with little waste, and delivering such crusts singly and in succession to a delivery platform. This object is accomplished by the device shown in the accompanying drawings, in which—

Figure 1 is a side elevation of a pie crust forming machine constructed according to this invention. Fig. 2 is a top plan of the same. Fig. 3 is a section of the same on the line A—A of Fig. 1. Fig. 4 is a sectional detail of the cutting knife on the line B—B of Fig. 3. Fig. 5 is a sectional detail on the line C—C of Fig. 3. Fig. 6 is a top plan showing the shape of the cuts which are made in the strip of dough in its passage between the two sets of rollers. Fig. 7 is a transverse section on the line D—D of Fig. 6. Fig. 8 is a detail showing the approximate shape of the finished crusts and indicating by a dotted circle the size to which it is trimmed.

In the form shown in the drawings, the apparatus comprises a feed hopper 1 which is adapted to hold a quantity of dough and which is so placed in the frame as to direct its contents into the trough between a pair of rollers 2 and 3 which are journaled on horizontal axes in the supporting frame 4. The rollers 2 and 3 are opposed to each other and so geared that the dough from the hopper 1 will be drawn between them and formed into a continuous strip of substantially uniform transverse section. The lower roller 3 is preferably cylindrical, while the upper roller 2 is grooved so as to present a concave surface toward the lower roller, the groove being of such form as to roll the strip to a section like that of Fig. 7, being considerably thicker in the middle than at its edges.

An inclined platform 5 guides the strip of dough which is indicated at 6 in Fig. 1 endwise toward a second set of rollers 7, from which it passes upon a delivery platform 8. The rollers 7 are preferably both of cylindrical form, and are spaced closer together than the rollers 2 and 3, so as to roll out the dough into a thin flat sheet indicated at 6ᵃ in Fig. 1. The platform 5 together with the lower rollers 3 and 7 form the feed surface along which the dough passes through the machine.

For the purpose of dividing the dough into uniform pieces, each of which is sufficient for a single pie crust, the strip 6 is cut up into narrow sections by means of a reciprocating knife or cutter 9 which is carried by a cross head 10 slidably mounted in guides 11 in the supporting frame. The cross head 10 is urged downward by means of a pair of cams 12 carried by the shaft 13. The cross head 10 is normally urged upward by means of springs 14, and the cam shaft 13 is geared to the shaft of the roller 2 by gears which are so proportioned that the space between successive cuts in the strip of dough will be right for forming each section into a substantially circular sheet after it passes the rollers 7.

The rollers 7 are driven from the roller 3 by means of the link-belt 16, and the sprockets which carry said belt are so proportioned that the rollers 7 will be driven at a considerablly greater speed than the rollers 2 and 3. This increase of speed is for the purpose of advancing the pieces of dough with sufficient rapidity so that the elongation which takes place in passing between the rollers 7 will not interfere with the advance of the succeeding piece of dough.

In order that the dough will roll to an approximately circular shape, the strip 6 is made thicker in the middle than at its edges, and the cutter is preferably curved and placed with its concave side facing rearwardly so that the cuts in the strip will appear as illustrated in Fig. 7, the arrow indicating the direction in which the strip advances. Scrapers 17 are provided for preventing the dough from adhering to the upper rollers 2 and 7. Power is applied by the pulley 18. The arrangement of gearing will be readily understood from Figs. 1 and 2, without detailed description.

The operation of the device shown is as follows:—A quantity of dough is placed in the hopper 1 and is drawn between the rollers 2 and 3, being thereby rolled into a continuous strip having a cross-section like that shown in Fig. 7. The strip advances along the platform 5 by gravity due to the inclination of said platform. The continuous rotation of the cam shaft 13 causes the cutter 9 to reciprocate and cut the strip into oblong sections whose long dimension corresponds to the width of the strip 6. These sections enter between the rollers 7 with their long dimensions substantially parallel with the axis of said rollers and are then rolled out to about the form shown at 6ª in Fig. 8. The shape of the groove in the roller 2 is so designed in proportion to the distance between cuts made by the cutter 9, that the elongating effect of the rollers 7 will produce a sheet of the desired shape.

What I claim as my invention and desire to secure by Letters Patent is:—

1. The combination of mechanism adapted to form a mass of plastic material into a strip of substantially uniform cross-section, means for feeding said strip lengthwise, a cutter mounted to operate intermittently across the path of said strip for cutting the same into a series of sections of substantially uniform size as it is fed along, and means for rolling said sections so as to form each into a flat sheet of substantially uniform thickness, said cutter being curved and concave toward the direction from which said strip is fed.

2. In a pie crust forming device, the combination of two pairs of opposed rollers journaled on substantially parallel axes, means for feeding dough from one pair to the other, and a cutter located between said pairs of rollers and adapted to cut the dough into sections of uniform length in its passage between said rollers, the second pair of rollers being driven at a considerably greater peripheral speed than the first pair.

Signed at Chicago this 18th day of May, 1908.

OLIVER COLBORNE.

Witnesses:
E. O. RUMMLER,
MARY M. DILLMAN.